UNITED STATES PATENT OFFICE.

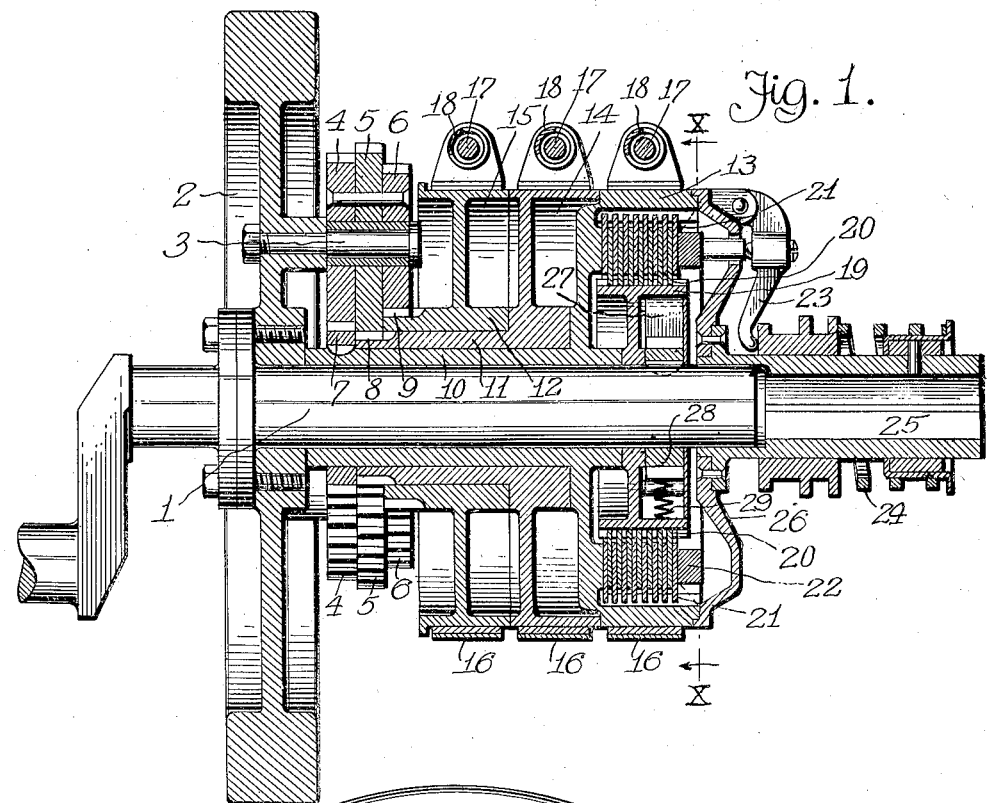
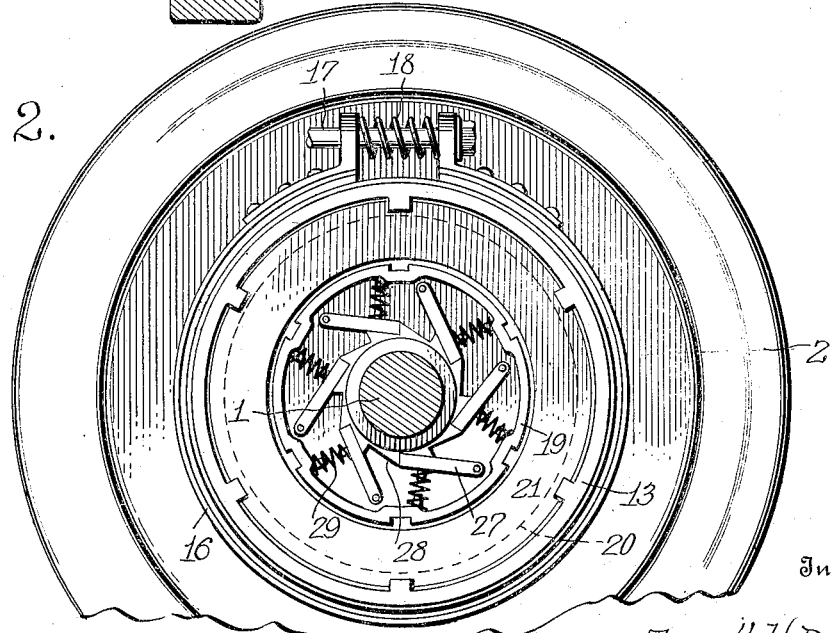

TYRRELL H. DUNCOMBE, OF ROMEO, MICHIGAN.

CHANGE-SPEED POWER-TRANSMITTING MECHANISM.

1,329,297.   Specification of Letters Patent.   Patented Jan. 27, 1920.

Application filed October 9, 1918. Serial No. 257,441.

*To all whom it may concern:*

Be it known that I, TYRRELL H. DUNCOMBE, a citizen of the United States of America, residing at Romeo, in the county of Macomb and State of Michigan, have invented certain new and useful Improvements in Change-Speed Power-Transmitting Mechanism, of which the following is a specification, reference being had therein to the accompanying drawing.

This invention relates to improvements in change speed power transmitting mechanisms and more particularly to mechanism especially adapted for use upon power driven vehicles of the type in which the power is transmitted from the engine to the rear axle of the vehicle by means of gearing arranged to transmit the power at different speeds.

An object of the invention is to provide means whereby the vehicle may proceed at a higher rate of speed than that at which it is being driven by the engine, as when going down hill, so that the vehicle may coast without driving the engine through the power transmitting mechanism.

A further object of the invention is to so arrange the mechanism that the vehicle may coast only when the engine is connected with the driving or traction wheels through the high speed connection of the transmission mechanism, thus permitting the employment of the engine as a brake to retard the progress of the car by connecting the engine and traction wheels through the intermediate or low speeds of the transmission gearing.

It is also an object of the invention to provide a very simple and compact construction of mechanism which may be readily applied to the ordinary forms of change speed transmission mechanism, particularly to the well known type of transmission mechanism embodying sun and planet gearing, the mechanism embodying the invention being so arranged that it may be applied to this type of transmission mechanism without material change therein or increasing the dimensions or arrangements of this common form of mechanism.

With these and other objects in view the invention consists in the matters hereinafter more fully described and particularly pointed out in the appended claims, reference being had to the accompanying drawing in which—

Figure 1 is a longitudinal vertical section through a common form of sun and planet change speed mechanism showing the invention embodied therein, and Fig. 2 is a transverse section of the same substantially upon the line X—X of Fig. 1.

For the purpose of illustration I have shown the invention as embodied in a particular type of the old and well known change speed mechanism but it will be understood that the invention may be readily applied to other forms and constructions of change speed gearing and I do not therefore limit myself to the particular form and arrangement of change speed mechanism shown.

As shown in the drawings, 1 indicates the engine crank shaft or driving member upon which is rigidly secured a fly wheel 2, this fly wheel 2 is provided with a series of studs 3 upon which are mounted to rotate freely thereon, sets of pinions each comprising three pinions 4, 5 and 6 of different diameters. These pinions are in engagement with corresponding gears 7, 8 and 9 upon corresponding concentric sleeves 10, 11 and 12 mounted upon the shaft 1 to turn freely thereon and to rotate independently of each other. The sleeve 10 has formed integral therewith at its rear end a drum 13 and the sleeves 11 and 12 are also provided with corresponding drums 14 and 15.

Suitable brake bands 16 are provided to engage the several drums, which brake bands may be supported and operated by any suitable mechanism including bolts 17 passing through eyes on the ends of the bands with coiled springs 18 sleeved on the bolts between the eyes. The mechanism for forcing the ends of the bands toward each other against the action of the springs is not shown in the drawings but may be of the usual form to independently operate the bands so that anyone of them may be brought into frictional engagement with its drum and hold the same against turning.

Free to rotate upon the shaft 1 within the drum 13, is a drum 19 and carried by them thereon is a series of annular friction disks 20 connected to the drum in the usual manner to turn therewith, and interposed between the disks 20 is a like series of disks 21 connected in the usual manner to the outer drum 13 to turn therewith, said disks together with their drums forming a multiple disk friction clutch of an old and well known form. A master ring 22 is provided to engage the disks and force them laterally into frictional contact, said ring being moved by the usual levers 23 carried by the drum 13 and operated by means of a coiled spring 24 sleeved upon a driven member or shaft 25 arranged in longitudinal axial alinement with the shaft 1 and connected to the drum 13 by means of a cover plate 26.

In the change speed mechanism described, the drum 19 is usually secured to the shaft 1 and thus when the friction disks are forced into engagement, motion is transmitted directly from the shaft 1 to the driven shaft 25 through the drum 13 and cover 26. In this construction the drum 19 is free to turn upon the shaft 1 but is connected thereto in one direction of its turning movement by means of pawls 27 pivotally attached to the drum at one end to engage a ratchet 28 at their opposite ends which ratchet is secured in any suitable manner to the shaft 1. The pawls 27 are held yieldingly in engagement with the ratchet by means of springs 29 so that the driving power of the shaft 1 will be transmitted by the ratchet 28 through the pawls 27 to the drum 19 and thence by means of a friction clutch and drum 13 to the driven shaft 25.

When the shaft 25 turns faster than the shaft 1, as for instance when the motor vehicle is running down hill, the pawls 27 slip over the teeth of the ratchet and permit the shaft 25 to turn faster than the engine shaft. The vehicle is therefore free to coast without driving the engine when the change speed mechanism is operated or connected up for transmitting power directly from the driving to the driven shaft at engine speed.

When one of the brake bands is operated to bring it into frictional contact with its drum and hold the same against turning, the change speed gears are brought into action in the usual manner, the clutch being thrown out and thus motion at a low speed is transmitted from the engine shaft through the fly wheel and gears to the sleeve 10 carrying the drum 13 which will turn the drum at slow speed and motion will be transmitted directly from this drum to the driven shaft in the usual manner. If under these conditions the driven shaft 25 is driven by the motor vehicle in attempting to travel at a higher rate of speed than it is being driven by the engine, the shaft 25 will operate the engine through the low speed mechanism and thus put a load on the driven shaft which will tend to retard the movement of the vehicle.

By interposing the pawl and ratchet mechanism between the shaft 1 and drum 19, said mechanism is therefore operative only when the friction clutch is operative and the vehicle is free to coast independently of the driving power in the high speed position of the change speed mechanism only.

Obviously, the pawl and ratchet connection mechanism may be embodied in any of the various forms of change speed mechanisms commonly used upon motor vehicles to effect the connection of the engine with the driven shaft through the member effecting a transmission of the motion at high speed.

Having thus fully described my invention what I claim is:—

1. A change-speed power transmitting mechanism including a driving member, a driven member, means for transmitting motion at high speed from said driving to said driven member, means for transmitting motion from said driving to said driven member at low speeds, and a one way driving connection for said high speed connecting means, whereby the driven member is free to turn at a greater speed than the driving member when the high speed connection is effective and said driving and driven members are directly connected through said low speed connecting means when said low speed connecting means is effective.

2. A change-speed power transmitting mechanism including a driving member, a driven member, means providing an operative connection between said driving and driven members to turn together at high speed and adapted to effect a disconnection between said members, change speed gearing for transmitting motion from said driving to said driven member at low speeds when said means for connecting said driving and driven members to transmit high speed is operated to effect a disconnection, and a one way connection between said driven member and said high speed connecting means, whereby said driven member is free to turn at greater speed than said driving member when said high speed connection is effective.

3. A change-speed power transmitting mechanism including a driving member, a driven member, change speed gearing for transmitting motion from the driving to the driven member at reduced speed, means for connecting the driving and driven members to turn together, and a one way driving connection between said means and driving member, whereby the driven member may overrun the driving member when said driving and driven members are connected by said means.

4. A change-speed power transmitting mechanism including a driving member, a driven member, change speed gearing for transmitting motion from the driving to the driven member at reduced speed, a clutch comprising two members one of which is directly connected to the driving member, and means for connecting the other clutch member to the driving member in one direction of rotation only.

5. A change-speed power transmitting mechanism including a driving member, a driven member, change speed gearing for transmitting motion from the driving to the driven member at reduced speed, a clutch comprising two members one of which is directly connected to the driven member to turn therewith, and a one way ratchet connection between the other clutch member and said driving member.

6. A change-speed power transmitting mechanism including a driving member, a driven member, change speed gearing for transmitting motion from the driving to the driven member at reduced speed, a clutch comprising an outer member secured to the driven member, an inner member, and one way driving means within the inner member for connecting the same to the driving member.

7. A change-speed power transmitting mechanism including a driving member, a driven member, change speed gearing for transmitting motion from the driving to the driven member at reduced speed, a multiple disk clutch including an outer drum member, an inner drum member, friction disks for connecting said drums to turn together, and a one way driving connection between one of said drums and one of said members.

In testimony whereof I affix my signature in the presence of two witnesses.

TYRRELL H. DUNCOMBE.

Witnesses:
ANNA M. DORR,
CHAS. W. STAUFFIGER.